US012712602B2

(12) United States Patent
Kumar et al.

(10) Patent No.: US 12,712,602 B2
(45) Date of Patent: Aug. 18, 2026

(54) WIRELESS COMMUNICATION SYSTEMS AND METHODS USING FEDERATED LEARNING AND SUPERVISED PREFERENTIAL OPTIMIZATION

(71) Applicant: AT&T Intellectual Property I, L.P., Atlanta, GA (US)

(72) Inventors: Ayush Kumar, East Brunswick, NJ (US); Prafulla Verma, Holmdel, NJ (US); Isilay Baran, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 17 days.

(21) Appl. No.: 19/045,029

(22) Filed: Feb. 4, 2025

(65) Prior Publication Data

US 2026/0230115 A1 Aug. 6, 2026

(51) Int. Cl.
*H04B 7/04* (2017.01)
*H04L 41/16* (2022.01)
*H04W 24/02* (2009.01)

(52) U.S. Cl.
CPC ......... *H04B 7/04013* (2023.05); *H04L 41/16* (2013.01); *H04W 24/02* (2013.01)

(58) Field of Classification Search
CPC ..... H04B 7/04013; H04L 41/16; H04W 24/02
See application file for complete search history.

(56) References Cited

U.S. PATENT DOCUMENTS 11,750,454 B2 * 9/2023 Dai .................... H04B 7/04013 370/254
2023/0274181 A1 * 8/2023 Bai ........................ G06N 20/00
2023/0276260 A1 * 8/2023 Abedini .............. H04W 68/005 370/254
2023/0319750 A1 * 10/2023 Balevi .................. H04B 17/391 370/329

OTHER PUBLICATIONS

Machine translation of CN-116757294-A (Year: 2023).*
Machine translation of CN-118233304-A (Year: 2024).*

* cited by examiner

*Primary Examiner* — Jean B Corrielus
(74) *Attorney, Agent, or Firm* — Guntin & Gust, PLC; Miyoung Shin

(57) ABSTRACT

Aspects of the subject disclosure may include, for example, systems and methods for improving wireless communication by selecting best configurations of intelligent reflecting surface (IRS) devices present in different wireless communication environments with supervised preferential optimization (SPO) technique and sharing parameters of the best configurations of IRS devices with a global shared model under federated learning setting. Other embodiments are disclosed.

20 Claims, 9 Drawing Sheets

CLOUD COMPUTING ENVIRONMENTS 375
VIRTUALIZED NETWORK FUNCTION CLOUD 325
VNE 330
VNE 332
VNE 334
300

TRANSPORT LAYER 350
BROADBAND ACCESS 110
VOICE ACCESS 130
WIRELESS ACCESS 120
MEDIA ACCESS 140
CONTENT SOURCES 175

600

WIRELESS COMMUNICATION SYSTEMS AND METHODS USING FEDERATED LEARNING AND SUPERVISED PREFERENTIAL OPTIMIZATION

FIELD OF THE DISCLOSURE

The subject disclosure relates to wireless communication systems and methods using federated learning and supervised preferential optimization.

BACKGROUND

Telecommunication companies are in a race to make data faster and reduce latency by using high-frequency operations. These operations can face signal weakening and blockage due to various obstacles present in wireless communication environments. Intelligent reflecting surfaces (IRS) operate to bounce and redirect signals, thereby enhancing quality of signals. Computer models used for IRS, however, encounter difficulties adapting to changes in surroundings or system settings without additional training, which can hinder optimal performance in new surroundings or new system settings.

BRIEF DESCRIPTION OF THE DRAWINGS

Reference will now be made to the accompanying drawings, which are not necessarily drawn to scale, and wherein.

DETAILED DESCRIPTION

Figure 1:
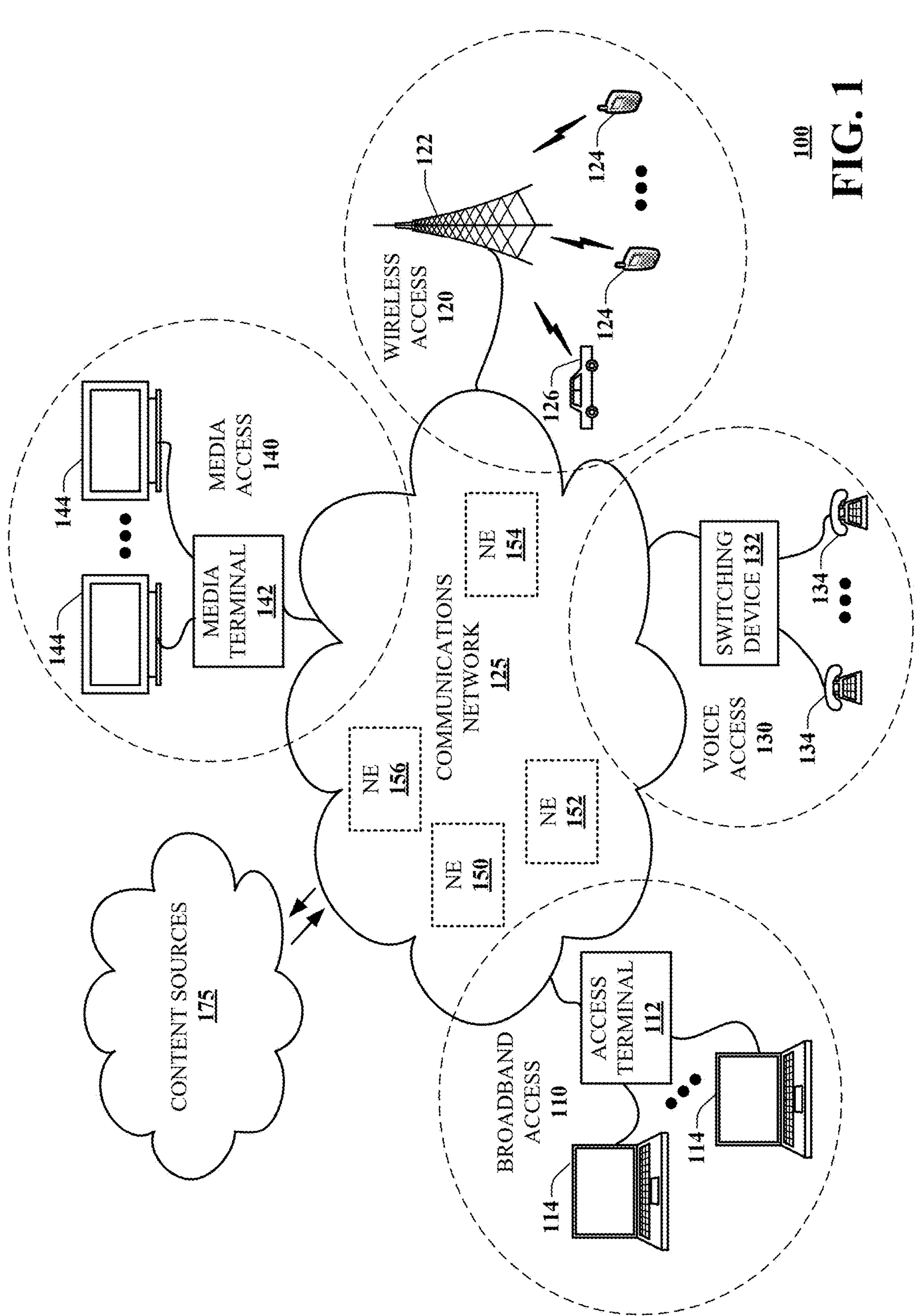
FIG. 1 is a block diagram illustrating an exemplary, non-limiting embodiment of a communications network in accordance with various aspects described herein.

The subject disclosure describes, among other things, illustrative embodiments for wireless communication systems and methods using federated learning and supervised preferential optimization. The systems and methods improve wireless communication by selecting the best configurations of intelligent reflecting surfaces (IRS) present in different wireless communication environments with supervised preferential optimization (SPO) technique and sharing parameters of the best configurations of IRS with a global shared model under federated learning setting. Other embodiments are described in the subject disclosure.

One or more aspects of the subject disclosure are directed to a system including a plurality of wireless communication network components implementing different wireless communication environments, wherein, in each of the plurality of wireless communication network components, one or more base stations and one or more user equipment (UE) communicate via an intelligent reflecting services (IRS) device present therein and wherein the IRS device tracks a different wireless communication environment, resulting in a different configuration of the IRS device; a processing system including a processor; and a memory that stores executable instructions that, when executed by the processing system, facilitate performance of operations. The operations include communicating with each of the plurality of wireless communication network components in a federated learning (FL) setting; maintaining a global shared model having gold standard parameters of a configuration of the IRS device; receiving, from each of the plurality of wireless communication network components, a parameter set, wherein the parameter set represents a best configuration of the IRS device based on the different wireless communication environment thereof, wherein the best configuration of the IRS device is learned and selected using a supervised preference optimization (SPO) machine learning technique; and updating the gold standard parameters of the global shared model based on the received parameter set.

One or more aspects of the subject disclosure include a non-transitory machine-readable medium, comprising executable instructions that, when executed by a processing system including a processor, facilitate performance of operations. The operations include maintaining a shared intelligent reflecting surface (IRS) configuration model; communicating with a plurality of wireless communication network components configured to represent different wireless communication environments, wherein each wireless communication network component comprises an action selection module running a supervised preference optimization (SPO) model and wherein the communicating comprises communicating with the action selection module in each of the plurality of wireless communication network components in a federated learning (FL) setting; receiving, from the action selection module, a parameter set, wherein the parameter set include information indicating a selected configuration of an IRS device operating in and tracking the different wireless communication environment, wherein the selected configuration of the IRS represents a best configuration that has been learned and determined using the SPO model; aggregating the parameter set from each action selection module of each wireless communication network component in the FL setting; and updating the shared IRS configuration model based on aggregated parameter sets.

One or more aspects of the subject disclosure include a method including maintaining, by a processing system including a processor, a shared intelligent reflecting surface (IRS) configuration model; communicating, by the processing system, with a plurality of wireless communication network components configured to implement different wireless communication environments, wherein each wireless communication network component comprises an IRS device including an action selection module, and wherein the action selection module is configured to adopt a supervised preference optimization (SPO) model and wherein the communicating comprises communicating with the action selection module in each of the plurality of wireless communication network components in a federated learning (FL) setting; receiving, by the processing system, from the action selection module, a parameter set, wherein the parameter set include information indicating selected IRS configuration operating in and tracking the different wireless communication environment, wherein the selected IRS configuration represents a best configuration that has been learned and determined using the SPO model; aggregating, by the processing system, the parameter set from each action selection module of each wireless communication network component in the FL setting; and updating, by the processing system, the shared IRS configuration model based on aggregated parameter sets.

Referring now to FIG. 1, a block diagram is shown illustrating an example, non-limiting embodiment of a system 100 in accordance with various aspects described herein. For example, system 100 can facilitate in whole or in part for wireless communication systems and methods using federated learning and supervised preferential optimization. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
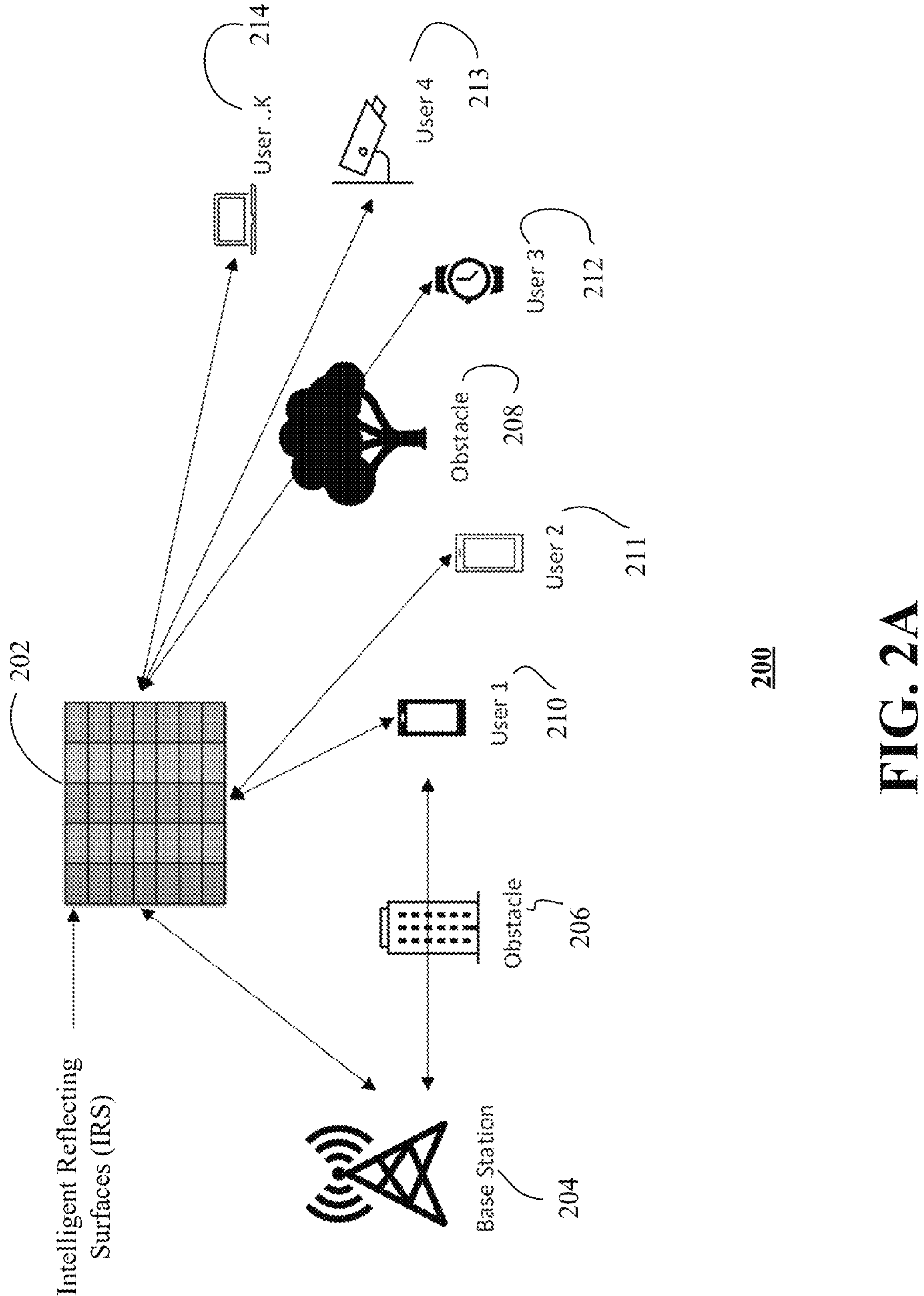
FIG. 2A is a block diagram illustrating an example, non-limiting embodiment of a wireless network component functioning within the communication network of FIG. 1 in accordance with various aspects described herein.

FIG. 2A is a block diagram illustrating an example, non-limiting embodiment of a wireless network component 200 functioning within the communication network of FIG. 1 in accordance with various aspects described herein. The wireless network component ("the Component") 200 represents an exemplary wireless network environment having various obstacles which potentially block or interfere with electromagnetic waves of wireless signals.

In various embodiments, a wireless network may include a wireless radio access network (RAN) and a Wi-Fi network. In exemplary embodiments, the wireless network may be implemented in open source software (e.g., in an OpenAirInterface (OAI) wireless technology platform). The wireless network may include network resources, such as one or more physical access resources and/or one or more virtual access resources. Physical access resources can include base station(s) (e.g., one or more eNodeBs, one or more gNodeBs, or the like, such as base stations), one or more satellites, one or more Gigabyte Passive Optical Networks (GPONs) or related components (e.g., Optical Line Terminal (s) (OLT), Optical Network Unit(s) (ONU), etc.), and/or the like. A base station may employ any suitable radio access technology (RAT), such as 4G/LTE, 5G, 6G, or any higher generation RAT. One or more edge computing devices (e.g., multi-access edge computing (MEC) devices or the like) may also be included in or associated with the wireless network. Virtual access resources can include a voice service system (e.g., a hardware and/or software implementation of voice-related functions), a video service system (e.g., a hardware and/or software implementation of video-related functions, such as coder-decoder or compression-decompression (CODEC) components or the like), a security service system (e.g., a hardware and/or software implementation of security-related functions), and/or the like. In one or more embodiments, the wireless network may include any number/types of physical/virtual access resources and various types of heterogeneous cell configurations with various quantities of cells and/or types of cells.

In certain embodiments, the wireless network may be implemented as a virtual RAN, where radio/wireline functions are implemented as general-purpose applications/apps that operate in virtualized environments and interact with physical resources either directly or via full/partial hardware emulation. Virtualized software radio applications can be delivered as a service and managed through a cloud controller. Here, base stations may be implemented as (e.g., passive) distributed radio elements connected to a centralized baseband processing pool. In some embodiments, the wireless network may include, or communicate with, a RAN intelligent controller (RIC).

In various embodiments, the Component 200 includes an intelligent reflecting surfaces (IRS) device 202 in communication with a base station 204 and various types of user devices in communication with the base station 204. One or more base stations (or cells) may provide network coverage for a given geographic area. User devices includes mobile devices 210, 211, various IoT devices 212, 213, computer devices 214, display and television devices, home and business networks, video and audio devices, autonomous vehicles, unmanned aerial vehicles (UAVs), and so on. User devices may be equipped with one or more transmitter (Tx) devices and/or one or more receiver (Rx) devices configured to communicate with the base station 204, and utilize network resources in the Component 200.

Various IoT devices include a smartwatch 212 and a camera 213 by integrating sensors, connectivity, and data processing capabilities to provide a wide range of functionalities. By connecting to the internet and other devices, IoT devices enable users to access real-time information and perform various tasks. A UAV may include any (e.g., manually controllable or autonomous) personal or commercial aerial vehicle or device that is equipped with one or more types of devices or components for performing various actions. In certain embodiments, a UAV may include one or more radio equipment configured to function as a cellular relay (e.g., low-powered cellular radio access (or small cell) node(s)), one or more sensors (e.g., image sensor(s), infrared sensor(s), near infrared camera(s), radar system(s), light detection and ranging (LIDAR) system(s), biological sensor (s), temperature sensor(s), chemical sensor(s), humidity sensor(s), and/or the like) for capturing information/data in an environment of the UAV, one or more mechanical limbs for physically manipulating external objects, and/or the like.

Unlike traditional methods that rely on active components like amplifiers and relays, the IRS device 202 operates passively, which reduces power consumption and operational costs. Additionally, IRS can be dynamically reconfigured in real-time to adapt to changing environmental conditions and user demands, providing a flexible and scalable approach to network optimization. Using Intelligent Reflecting Surfaces (IRS) in the field of wireless communications may significantly enhance signal quality, coverage, and overall network efficiency. The integration of IRS into wireless communication systems can lead to numerous benefits, including improved signal strength, enhanced coverage, and increased energy efficiency. By leveraging advanced techniques such as machine learning and optimization algorithms, the IRS device 202 can autonomously learn and adjust its configuration to achieve optimal performance. This enables the IRS device 202 to offer a cost-effective and energy-efficient solution to meet the growing demand for high-speed, reliable connectivity. The IRS device 202 operates to bounce and redirect signals to provide the high-speed, reliable connectivity.

Referring back to FIG. 2A, the IRS device 202 includes a large array of passive reflecting elements, each of which can independently adjust the phase of the incoming electromagnetic waves. By intelligently controlling these phase shifts, the IRS device 202 can manipulate the propagation environment to direct signals towards desired locations, mitigate interference, and overcome obstacles such as buildings or other physical barriers. As depicted in FIG. 2A, the IRS device 202 is structured and configured to direct signals in light of various obstacles 206, 208 present in the Component 200. As depicted in FIG. 2A, a signal from the base station 204 to the mobile device 210 is blocked by the obstacle 206 which will likely impact signal quality and strength. The signal can be bounced and/or redirected by the IRS device 202 in order to avoid the obstacle 206 and the mobile device 210 may receive better quality signal via the IRS device 202. Computer models used for the IRS device 202 may change parameters to reflect and bounce electromagnetic waves based on the surroundings or system settings. Additionally or alternatively, the IRS device 202 can move unmanned based on artificial intelligence to address obstacles that have moved into an area. Further additionally, the IRS device 202 can be relocated or repositioned to address new obstacles or certain changes (e.g., demolition of a tall building) in the Component 200.

Computer models used for the IRS device 202 may be trained using reinforcement learning. In response to the wireless communication environment, computer models can take actions and output of the IRS device 202 will be analyzed while trained with Reinforcement Learning. When the output indicates increased signal quality, then there is a reward mechanism that recommends pursuing the same action, and for reduced signal quality, the action may be penalized. Accordingly, Reinforcement Learning applies a trial and error approach, where the wireless communication environment is not known and possible outcomes may be unknown. This approach may involve a relatively large amount of computation power.

In various embodiments of the present disclosure, computer models used for the IRS device 202 may be trained using Supervised Preference Optimization (SPO). Instead of getting feedback from the wireless communication environment like the Reinforcement Learning (RL), SPO uses a dataset of human preferences and ensures to generate preferred outcomes more often and not preferred outcomes less often, as will be described in more detail below in connection with FIG. 2B. SPO is different from the Reinforcement Learning (RL) with respect to IRS devices. For preference data collection, RL relies on a predefined reward function. SPO collects preference data directly from networking experts for better real-world alignment. For state representation module, RL and SPO use a same module to capture wireless environment features. For supervised learning model training, RL relies on trial-and-error learning, but SPO uses expert preference data for more efficient learning aligned with expert expectations. For ensuring excellence, RL evaluates based on accumulated rewards and SPO validates based on predicting expert preferences for better real-world alignment. For real-time monitoring, RL and SPO monitor the wireless communication environment similarly. For decision-making and IRS adjustment, RL adjusts IRS based on the learned policy, which may not capture expert preferences. SPO predicts optimal IRS configuration based on expert preferences for better real-world alignment. For continuous adaptation, RL continuously adapts based on the reward function, and SPO adapts based on expert preferences, offering a more flexible and robust solution. SPO, focusing on expert preferences and using supervised learning, improves performance of IRS devices over traditional RL, aligning better with real-world expectations and expert opinions. This improvement in performance of the IRS devices results in improvement of performance of the network including increasing efficiency, decreasing interference, increasing throughput, and so forth.

Figure 2B:
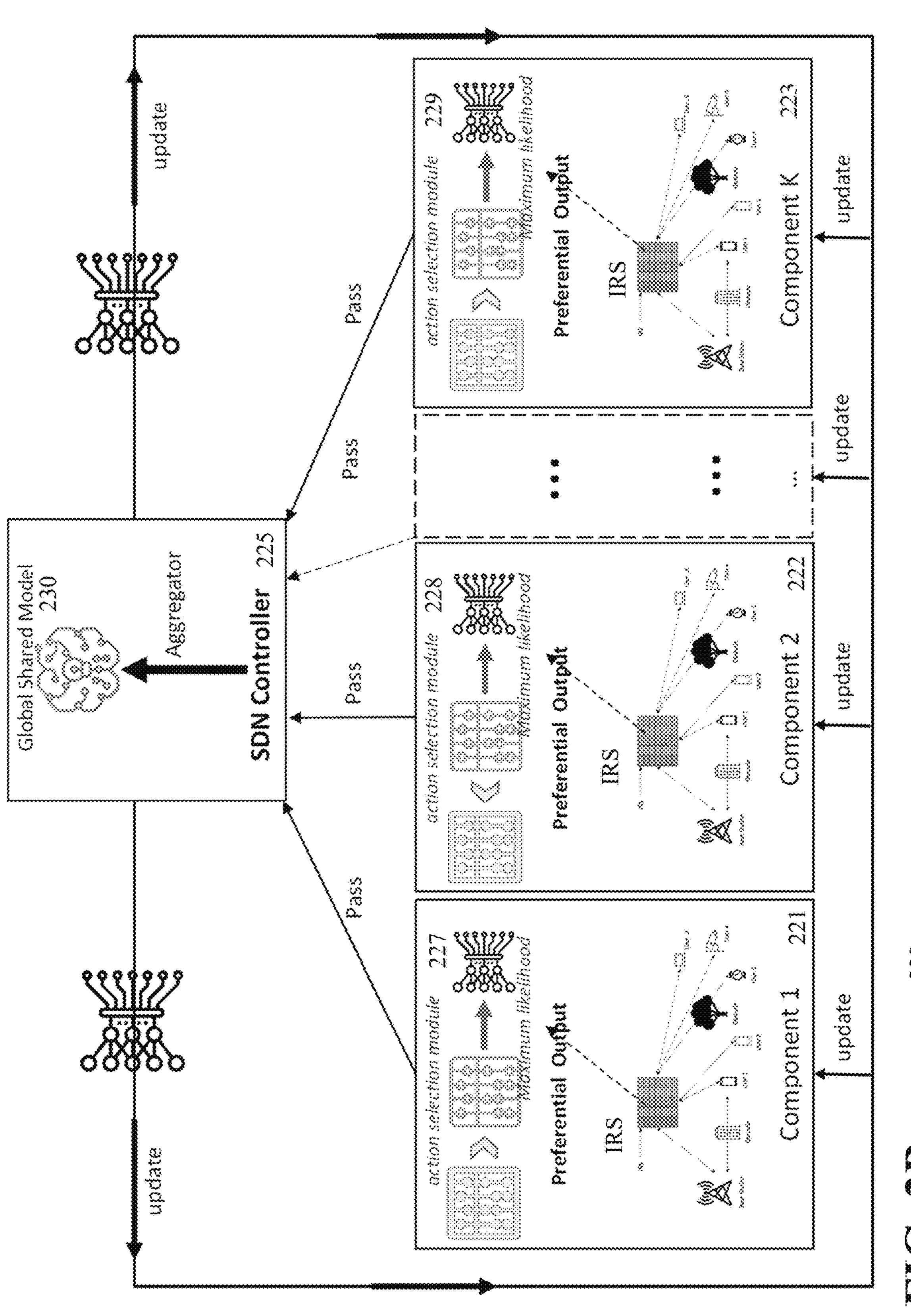
FIG. 2B is a block diagram illustrating an example, non-limiting embodiment of a system functioning within the communication network of FIG. 1 in accordance with various aspects described herein.

FIG. 2B is a block diagram illustrating an example, non-limiting embodiment of a system 220 in accordance with various aspects described herein. The system 220 includes a plurality of components such as Component 1, Component 2, Component K, 221, 222, 223, respectively. Each component includes intelligent reflecting surfaces (IRS) device(s), base station(s), various types of user equipment communicating with the base station(s), and different obstacles, as described above in connection with FIG. 2A. Each component such as Component 1, Component 2, Component K, etc. may represent and implement a different wireless communication environment where different obstacles are present at different locations, different arrangements of base station(s) and different sets of user equipment. By way of example only, Component 1 implements office building settings, Component 2 represents hospital settings, Component K implements a rural area, etc.

In various embodiments, in order to facilitate optimal performance, the system 220 may apply Federated Learning (FL) and Supervised Preference Optimization (SPO) for IRS improvement in wireless communication networks such as 5G/6G. SPO is used to train AI/ML models of the IRS device in selecting the best configuration of the IRS device. SPO is a sophisticated machine learning technique that enhances decision-making processes by directly incorporating human preferences into a model training phase. The system 220 utilizes the SPO machine learning technique to handle changes in surroundings and system settings in a controlled way, all in one go. Instead of getting feedback from the surroundings like traditional reinforcement learning (RL), where an artificial intelligence/machine learning (AI/ML) learns the best way to control the IRS device by a trial and error, an AI/ML model using SPO turns the controlling of the IRS device into a classification task. SPO uses a dataset of human preferences, where each pair has a prompt and two possible outcomes (one preferred, one not preferred). SPO makes sure to generate the preferred outcomes more often and the not preferred outcomes less often.

Additionally, the selected configuration of the IRS device in each component is passed to and shared as a global shared model 230 at a central point in the FL setting. Applying SPO in the FL setting may precisely control component(s) of the system 220 in managing IRS devices. The FL setting will be described more in detail below.

In various embodiments, IRS devices are deployed in each component 221, 222, 223, etc., each of which represents and implements a different wireless communication environment or situation in order to collect data. For instance, a number of deployed IRS devices varies depending on wireless communication environments. For a more crowded area with a large number of obstacles, more IRS devices can be deployed as opposed to rural areas. The deployed IRS devices start receiving signals from base stations, user equipment and obstacles. The deployed IRS devices scan particular wireless communication environment and collect data. Based on the collected data, preferred outcomes and unpreferred outcomes can be determined with the action selection module. The action selection module is a trained supervised model or a trained classification model using the SPO machine learning technique. With this training, a current outcome can be classified as a preferred outcome or not and the IRS device can be further controlled to be more efficient, more accurate, and be less energy consuming.

In various embodiments, each IRS device is equipped with an action selection module 227, 228, 229, etc., as depicted in FIG. 2B. The action selection module is configured to include an AI/ML model. The action selection module facilitates part of preference optimization and chooses the best IRS configuration based on the wireless communication environment in each component and the AI/ML model's decision-making policies. The system 220 adopts SPO to train the action selection module for selecting which action to take. SPO maximizes the chance of preferred outcomes and minimizes not preferred ones to improve signal quality and coverage over time. Existing methods teach model desired behaviors through sets of human preferences after initial unsupervised pre-training. This happens at each IRS device and SPO generates an output for signal quality. The supervised training is the reason to avoid uninformed decision making, which happens in the RL system where actions are taken randomly and rewards are assigned on the basis of the output which can be both negative rewards for a not preferred option and positive reward for a preferred option. This won't be the case in the SPO driven system where there will be a model which will be guided on the basis of a preferred output as it was trained on the preferable output from human.

In Component 1 (221), the action selection module 227 is configured to track the wireless environment, including device positions, movement, obstacles, signal strength, etc. The action selection module 227 is configured to maximize a likelihood of preferred actions to control the phase shifts of reflecting elements. This optimization improves the signal strength of a wireless communication link between a transmitter and a receiver. The action selection module 227 is configured to employ SPO, which directly optimizes the AI/ML model for preferred outcomes. The SPO formulates the action taken as a classification task, where each expected outcome is classified as either a preferred outcome or a not preferred outcome. This SPO approach is computationally efficient as it avoids multiple rounds of trial-and-error. In Component 2 (222) and Component K (223), the respective action selection modules 228 and 229 are configured to employ SPO using the AI/ML model, as described above in connection with Component 1.

In various embodiments, SPO involves collecting preference data directly from networking experts for better real-world alignment. For a state representation module, SPO uses the action selection module to capture wireless environment features. For supervised learning model training, SPO uses expert preference data for more efficient learning aligned with expert expectations. For ensuring excellence, SPO validates based on predicting expert preferences for better real-world alignment. For real-time monitoring, SPO monitor the environment. For decision-making and IRS Adjustment, SPO predicts optimal IRS configuration based on expert preferences for better alignment. For continuous adaptation, SPO adapts based on expert preferences, offering a more flexible and robust solution. SPO, focusing on expert preferences and using supervised learning, improves performance of IRS devices.

In optimizing IRS configurations, expert preference data and AI/ML decision-making policies play an important role. For example, in an urban office building, expert data may prioritize strong signal strength during peak hours (9 AM to 5 PM), successful handovers between floors, and minimal interference from neighboring networks. The action selection module captures the current wireless environment, including user density and obstacles, and selects the best IRS configuration based on these preferences. A preferred outcome would be an IRS configuration that reflects signals towards high-density areas like conference rooms during peak hours, significantly improving signal strength and user satisfaction. Conversely, a not preferred outcome might involve misallocating resources to low-density areas or causing interference, leading to user dissatisfaction.

Similarly, in a hospital setting, expert data emphasizes strong signals in critical areas such as intensive care units (ICUs) and operating rooms, reliable connectivity for medical devices, and minimal interference with sensitive equipment. The action selection module optimizes the IRS configuration to ensure seamless connectivity in these critical areas, enhancing patient care. A preferred configuration might ensure strong and reliable signals in critical areas, while a not preferred configuration could misallocate resources or cause interference, posing risks to patient care.

As another example, a wireless communication environment may include a large number of obstacles such as many buildings in a crowded area. Expert preference data may prioritize avoiding obstacles and the action selection module selects the best IRS configuration that can reflect and tilt electromagnetic waves to open spaces around obstacles.

The action selection module 227, 228, 229 of each IRS device in each component 221, 222, 223, etc. is trained to maximize a likelihood of generating preferred outcomes while minimizing an occurrence of non-preferred ones with respect to selecting the IRS configuration. This SPO approach allows for more efficient and effective decision-making, as it aligns the AI/ML model outputs with human expectations and preferences. SPO is particularly useful in complex environments where the cost of suboptimal actions is high and rapid adaptation to changing conditions is important. By leveraging expert knowledge and preference data, SPO can significantly improve the real-world applicability and user satisfaction of machine learning systems.

In various embodiments, the IRS devices in the components 221, 222, 223, etc. have associated parameters such as the strength of signal, noises, user location, other environmental factors, etc. When a current state has a higher noise level, the traditional Reinforcement Learning (RL) penalizes an action leading to the current state. When SPO is applied, the current state is already classified as not preferred with the supervised machine learning and an output is not advisable. Without making any change to the IRS devices, another way is suggested for the IRS devices and no adjustment or modification may be made by the IRS devices (e.g., changing phases of reflecting surfaces). In other words, when the current state is not desirable or preferred, the IRS devices do not make an adjustment and find a different option with the SPO technique.

Referring back to FIG. 2B, the plurality of components such as Component 1, Component 2, Component K, 221, 222, 223 are in communication with a software-defined network (SDN) controller 225. In various embodiments, SDN controllers serve as a central control point for managing network resources and traffic flows. SDN controllers operate by decoupling the control plane from the data plane, allowing network administrators to dynamically adjust network configurations and policies through software applications. SDN controllers communicates with network devices using standardized protocols, such as OpenFlow, to direct traffic and optimize network performance. Referring back to FIG. 2B, the SDN controller 225 serves as a central control point for implementing and facilitating the FL settings for each IRS configuration. For example, the SDN controller 225 may reside in a cloud setting and receives parameters or parameter sets from different components 221, 222, 223, etc. which operate in different wireless communication settings such as a crowded city, a concert area, a hospital, etc.

In various embodiments, Federated learning (FL) is a distributed machine learning approach that enables multiple devices or servers to collaboratively train a shared model while keeping the data localized. This FL method addresses privacy, security, and data governance concerns by ensuring that raw data do not leave local devices. Data remains on the local devices (e.g., smartphones, IoT devices, or edge servers) where it is generated. This approach mitigates the risks associated with centralized data storage, such as data breaches and privacy violations. Instead, model updates, such as gradients or parameters, are shared and aggregated to improve a global model. Each participating device trains a local model using its own data. This local training process involves computing gradients or model updates based on the local dataset. After local training, the local devices send their model updates to a central server or aggregator. The central server then aggregates these updates to form a new global model. This aggregation can be done using various techniques, such as federated averaging, which computes the weighted average of the local model updates.

The global shared model, such as the global shared model 230 in FIG. 2B, is periodically updated and sent back to the local devices for further training. This iterative process continues until the model converges or achieves the desired performance. By keeping the raw data on local devices, FL may significantly reduce the risk of data exposure and privacy breaches. Only model updates may be shared, which contain less sensitive information. FL may minimize the need to transfer large volumes of data to a central server, reducing network bandwidth usage and associated costs. The decentralized nature of federated learning allows it to scale efficiently across a large number of devices, making it suitable for applications involving massive datasets and distributed data sources. FL may enable the creation of personalized models that can adapt to the specific data and usage patterns of individual devices, improving the overall performance and user experience. FL may be utilized for training models on data generated by smart devices, such as smartphones, wearables, IoT devices, autonomous vehicles, etc.

In the system 220, FL is utilized for training the IRS devices in each component. Using the above examples of expert preference data and AI/ML decision-making policies, in the FL setting, different components like an urban office building and a hospital optimize IRS configurations collaboratively. For instance, the office component might enhance signal strength in high-density areas during peak hours, while the hospital component ensures strong signals in critical areas. Aggregating these configurations at a central point leads to a balanced shared model 230 that enhances overall network performance, catering to both environments. This approach ensures that both office users experience fewer dropped calls during peak hours and hospital users benefit from reliable connectivity, ultimately improving signal quality and coverage while aligning with real-world expectations and expert opinions. In other words, the balanced shared model 230 may establish a gold standard based on all the inputs, having knowledge on different situations such as city areas, rural areas, etc. In artificial intelligence/machine learning field, a gold standard is often used to evaluate and validate the performance of models or algorithms. The gold standard provides a target for models to achieve or surpass, ensuring that the system's outputs align with the highest or selected standards of accuracy and efficiency. The gold standard helps ensure that the IRS configurations are continuously optimized, improving signal quality, coverage, and overall network performance.

As described above, the system 220 utilizes SPO combined with FL, which can use knowledge from "many models" (i.e., each component) to control IRS in the best way and make the reflected signals stronger. This may keep it scalable and strong. This method of combining SPO with FL uses real-world data from different places and sources to get better, leading to more diverse data and real-world results. Additionally, federated learning settings with trained models, either supervised or unsupervised, can control IRS devices for network improvement. This may improve wireless communication, giving us faster data, fewer delays, and better signals, in light of a demand for faster and more reliable wireless communication.

In various embodiments, the system 220 operates as follows. In each component, when a device or base station sends a signal to the IRS device, the IRS device then reflects, absorbs, or transmits the signal using its reflecting elements, based on what the IRS has learned. The respective action selection modules 227, 228, 229, etc., part of preference optimization, chooses the best IRS configuration based on the environment and the AI/ML model's decision-making policy. In each action selection module 227, 228, 229, etc., applying SPO then maximizes the chance of preferred outcomes and minimizes not preferred ones to improve signal quality and coverage over time. Existing methods teach a model desired behaviors through sets of human preferences after initial unsupervised pre-training. This happens at each IRS device. SPO generates an output for signal quality, and federated learning lets multiple IRS devices learn together while keeping their data private. After local training, where each IRS device learns to take the best action, the SDN controller 225 combines parameters passed from all local AI/ML models to update a shared model 230, as depicted in FIG. 2B. Parameter updates from this shared model 230 is sent back to all IRS devices, optimizing their configurations as a feedback. The feedback operates like a loop such that local models have some parameters relevant to IRS and a global shared model will share parameters relevant to IRS with local models and local models will get updated. If performance after update may be unsatisfactory, IRS devices may revert and report an issue for an update. This dynamic process adapts to changing conditions and user needs in real-time.

In various embodiments, in the FL setting, each IRS collaborates to learn the shared model 230 that optimizes the wireless communication environment. FL allows multiple IRS devices in each component 221, 222, 223, etc., to learn together while keeping their data private. This collaborative approach enables learning from diverse environments, resulting in more generalized and robust policies. This not only reduces data transmission but also saves energy and mitigates network congestion. A service provider, such as a major telecommunication company, not only grants access to extensive datasets encompassing wireless communication, network performance, and user behaviors but also benefits from a substantial customer base.

In various embodiments, the combination of SPO and FL can be implemented in various settings, such as office buildings, hospitals, or shopping malls, in order to enhance the signal quality, coverage, and efficiency of wireless communication systems. Additionally, the combination of SPO and FL may reduce the amount of data that needs to be transmitted to a centralized server, leading to energy savings and reduced network congestion. As described above, the system 220 may improve performance of IRS devices by combining FL and SPO, which intelligently controls the reflection, absorption, and transmission of electromagnetic waves. This, in turn, enhances the signal quality, coverage, and efficiency of wireless communication systems. The system 220 may enhance wireless communication performance in the upcoming 6G era by improving signal quality, energy efficient, and cost-effective enhanced coverage.

Figure 2C:
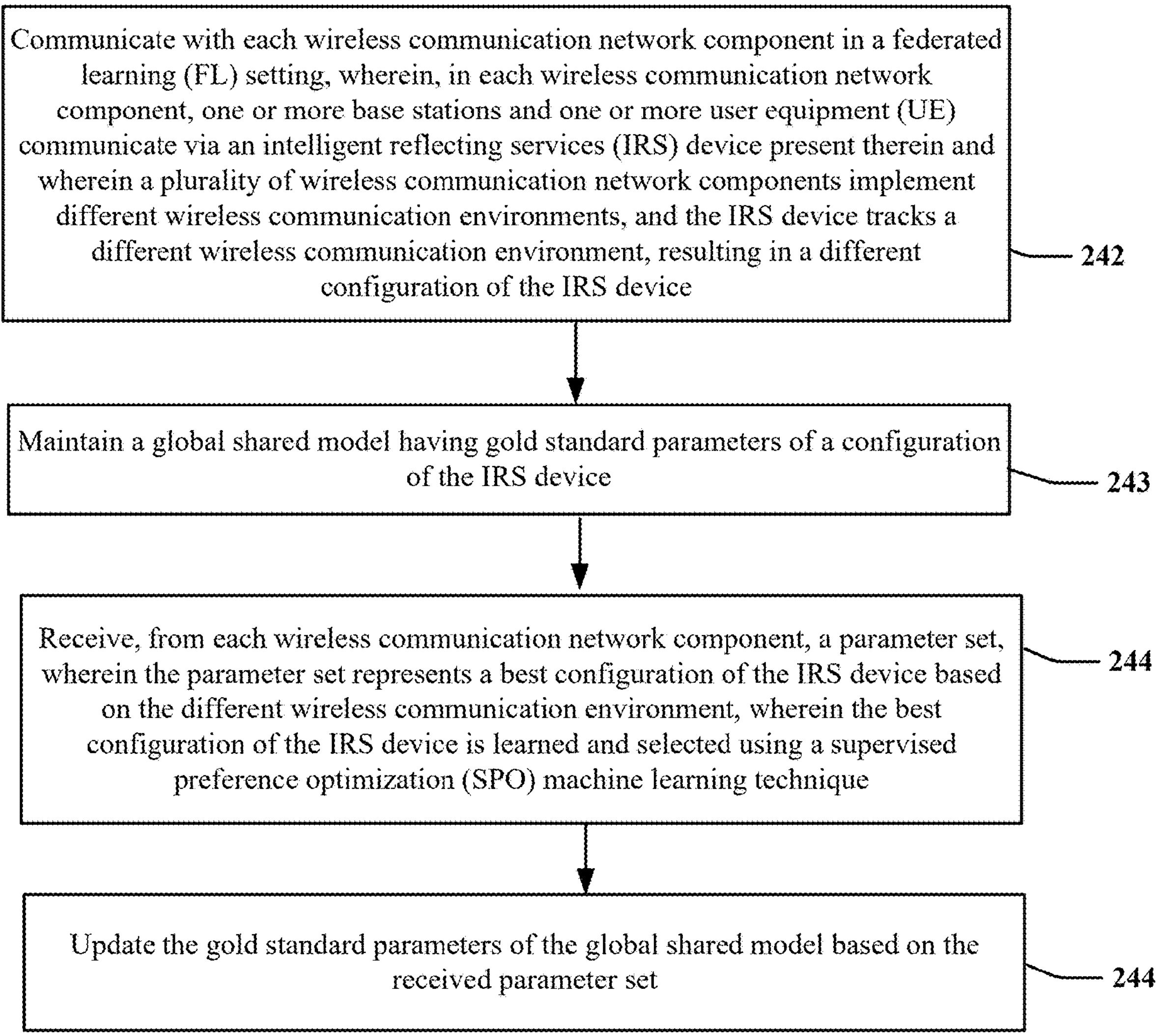
FIG. 2C depicts an illustrative embodiment of a method in accordance with various aspects described herein.

FIG. 2C depicts an illustrative embodiment of a method 240 in accordance with various aspects described herein. In various embodiments, the method 240 includes communicating with each wireless communication network component in a federated learning (FL) setting (Step 242). Each wireless communication network component comprises one or more base stations and one or more user equipment (UE) that communicate via an Intelligent Reflecting Surface (IRS) device present therein. Each wireless communication network component implement a different wireless communication environment which includes, for example, different obstacles, a different number of base stations, user equipment, etc. The IRS device reflects, absorbs, or transmits electromagnetic waves of wireless signals using its reflecting elements to avoid crowded areas, obstacles, etc. and provide a strong signal path between base stations and user equipment. The plurality of wireless communication network components implement different wireless communication environments, resulting in different configurations of the IRS device (Step 242).

The method 240 further includes maintaining a global shared model having gold standard parameters of a configuration of the IRS device (Step 243). For instance, the gold standard parameters refer to a reference model that represents the optimal configuration or outcome. As another example, the gold standard parameters refer to a balanced model that caters to different wireless communication environments. The gold standard parameters are obtained by aggregating the best IRS configurations from various wireless communication environments.

The method 240 further includes receiving, from each wireless communication network component, a parameter set. This parameter set represents the best configuration of the IRS device based on a different wireless communication network environment, where the best configuration is learned and selected using a supervised preference optimization (SPO) machine learning technique (Step 244). As described in connection with FIG. 2B above, the IRS device includes an action selection module which is configured to track a different wireless communication environment, such as tracking device positions, movement, obstacles, and signal strength. The action selection module further includes an AI/ML model trained with SPO and selects a best configuration of the IRS device based on preferred optimization outcome and not preferred optimization outcome in connection with expert preference data. The best configuration of the IRS device is selected based on expert preference data and artificial intelligence/machine learning (AI/ML) decision-making policies. SPO maximizes the change of preferred outcomes and minimizes not preferred outcomes to improve signal quality and coverage over time. SPO generates an output for signal quality, while keeping their data private. After local training, the IRS device learns to take the best action.

The method 240 includes updating the gold standard parameters of the global shared model based on the received parameter set, thereby refining the global shared model to enhance overall network performance (Step 244). Prior to the updating the gold standard parameters, the method 240 further includes aggregating the parameter set from each of the plurality of wireless communication network components to form unified parameters. The method 240 further includes sending updated parameters of the global shared model to the plurality of wireless communication network components via a feedback loop.

Figure 2D:
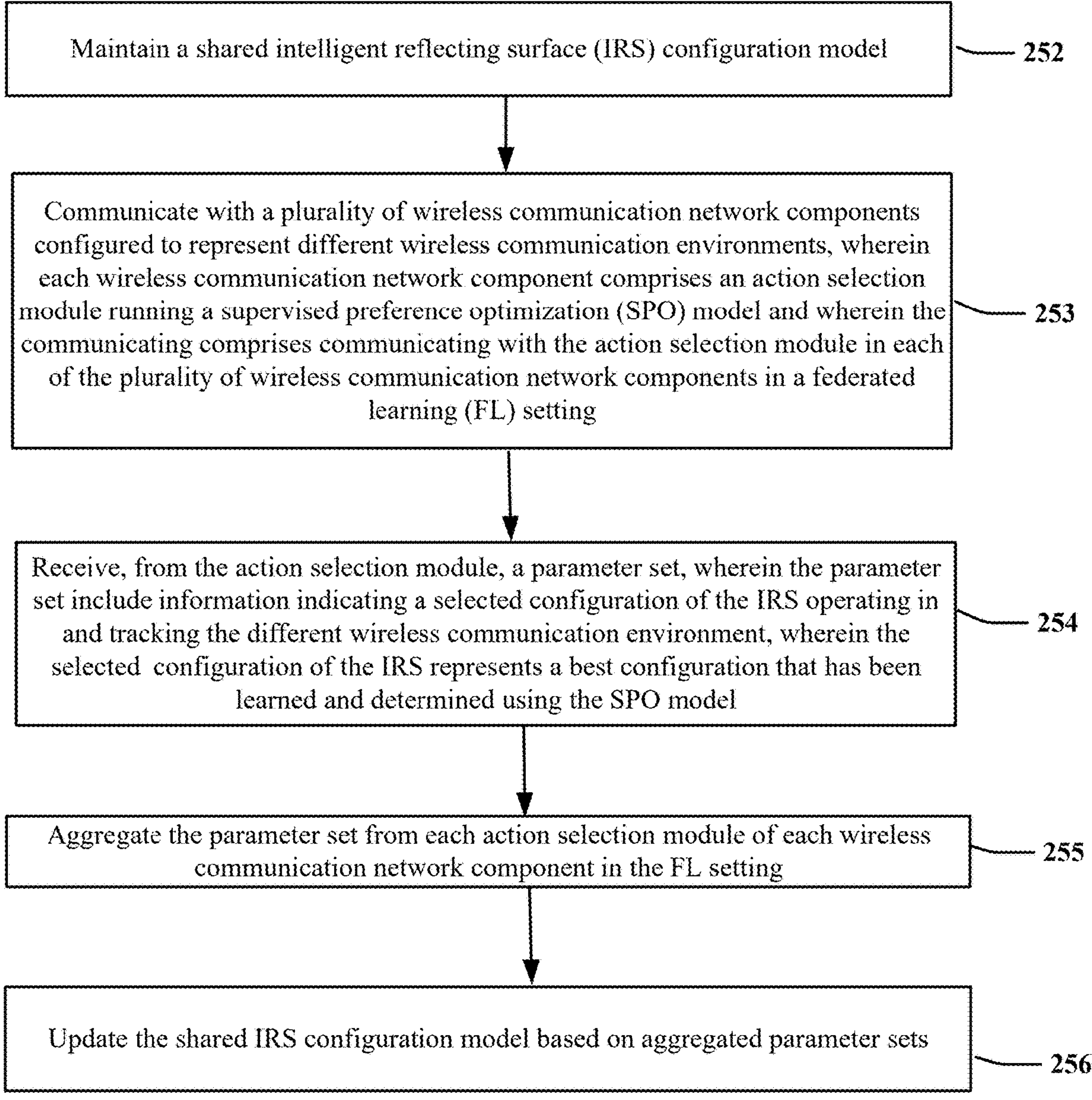
FIG. 2D depicts an illustrative embodiment of another method in accordance with various aspects described herein.

FIG. 2D depicts an illustrative embodiment of a method 250 in accordance with various aspects described herein. In various embodiments, the method 250 includes maintaining a shared intelligent reflecting surface (IRS) configuration model (Step 252). The method 250 further includes communicating with a plurality of wireless communication network components, each of the plurality of wireless communication network components configured to represent different wireless communication environments. Each network component comprises an action selection module running a supervised preference optimization (SPO) model, and the communication occurs with the action selection module in each component within a federated learning (FL) setting (Step 253). The method 250 further includes receiving, from the action selection module, a parameter set. This parameter set contains information indicating the selected IRS configuration operating in and tracking the different wireless communication environments, where the selected IRS configuration represents the best configuration learned and determined using the SPO model (Step 254). The best configuration of the IRS device is selected to adopt the preferred configuration of the IRS device and avoid the not preferred configuration of the IRS device. The method 250 also involves aggregating the parameter set from each action selection module of each wireless communication network component in the FL setting (Step 255). Finally, the shared IRS configuration model is updated based on the aggregated parameter sets, ensuring that the model reflects the most balanced or effective configurations across various wireless communication environments (Step 256).

In various embodiments, the method 250 further includes sending a feedback based on the updated shared IRS configuration model to the action selection module of each wireless communication network component. In the method 250, the parameter set does not include operation data and performance data of the wireless communication network component, as the operation data and the performance data are locally maintained in each wireless communication network component.

While for purposes of simplicity of explanation, the respective processes are shown and described as a series of blocks in FIGS. 2C-2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In the above-described embodiments, the performance of intelligent reflecting surfaces (IRS) is improved by combining federated learning (FL) and supervised preferential optimization (SPO). The wireless communication environment may be improved by intelligently controlling the reflection, absorption, and transmission of electromagnetic waves, thereby enhancing the signal quality, coverage, and efficiency of wireless communication systems. SPO facilitates maximizing the likelihood of preferred actions that control the phase shifts of reflecting elements. This optimization improves the signal strength of a wireless communication link between a transmitter and a receiver. SPO directly optimizes the model for preferred outcomes. It formulates the action taken as a classification task, where each expected outcome is classified as either a preferred or misreferred outcome. SPO is computationally efficient as it avoids multiple rounds of trial-and-error. In a federated setting, intelligent surfaces collaborate to learn a shared model that optimizes the wireless communication environment.

Federated learning allows multiple intelligent reflecting surfaces to learn together while keeping their data private. This collaborative approach enables learning from diverse environments, resulting in more generalized and robust policies. This not only reduces data transmission but also saves energy and mitigates network congestion. Implementing the combination of SPO and FL in various settings, such as office buildings, hospitals, or shopping malls, can enhance the signal quality, coverage, and efficiency of wireless communication systems. Additionally, it reduces the amount of data that needs to be transmitted to a centralized server, leading to energy savings and reduced network congestion. The combination of SPO and FL has the potential to significantly improve the wireless communication industry, providing more efficient and robust intelligent reflecting surfaces.

Figure 3:
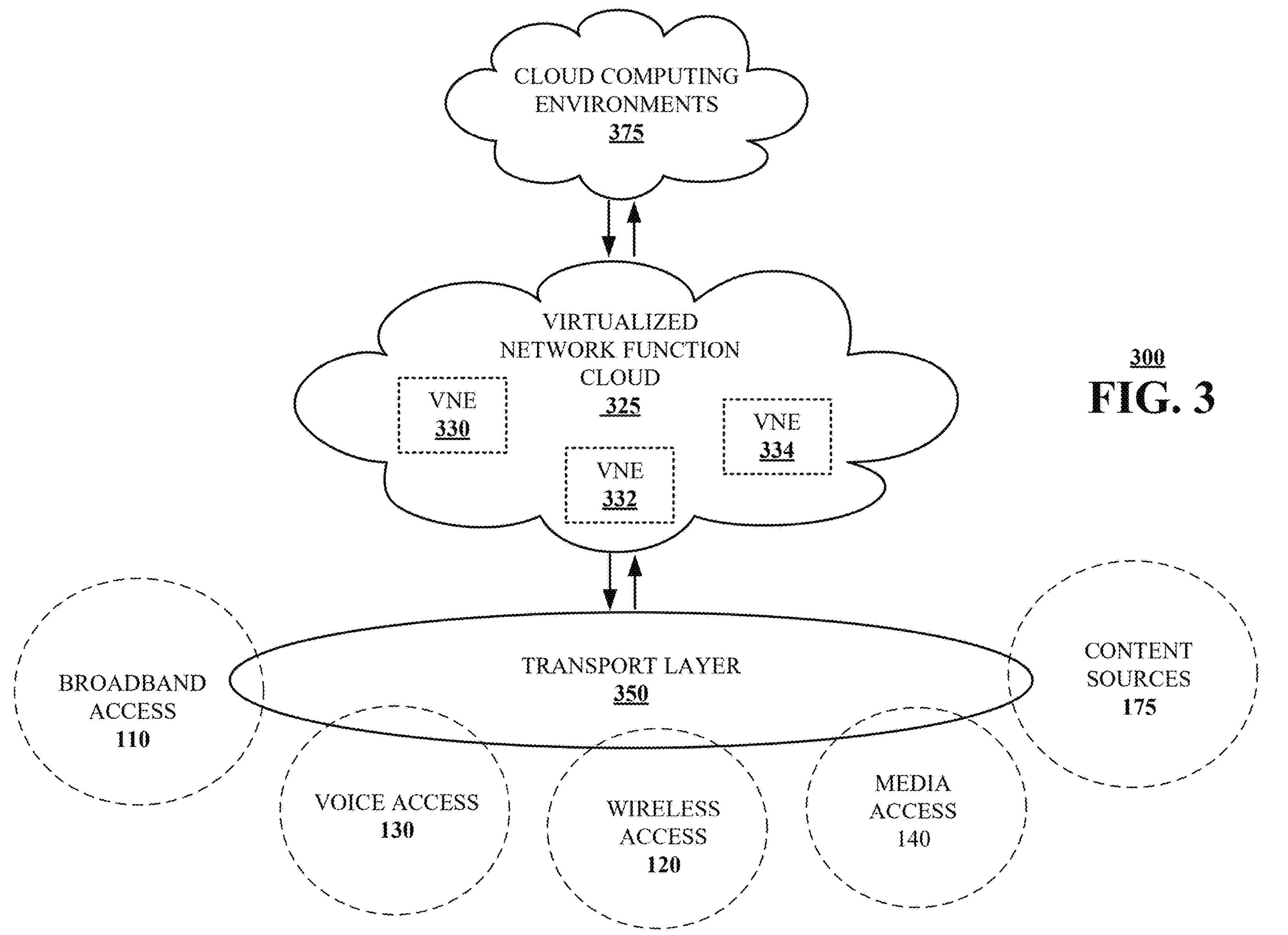
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3. For example, virtualized communication network 300 can facilitate in whole or in part wireless communication systems and methods using federated learning and supervised preferential optimization.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
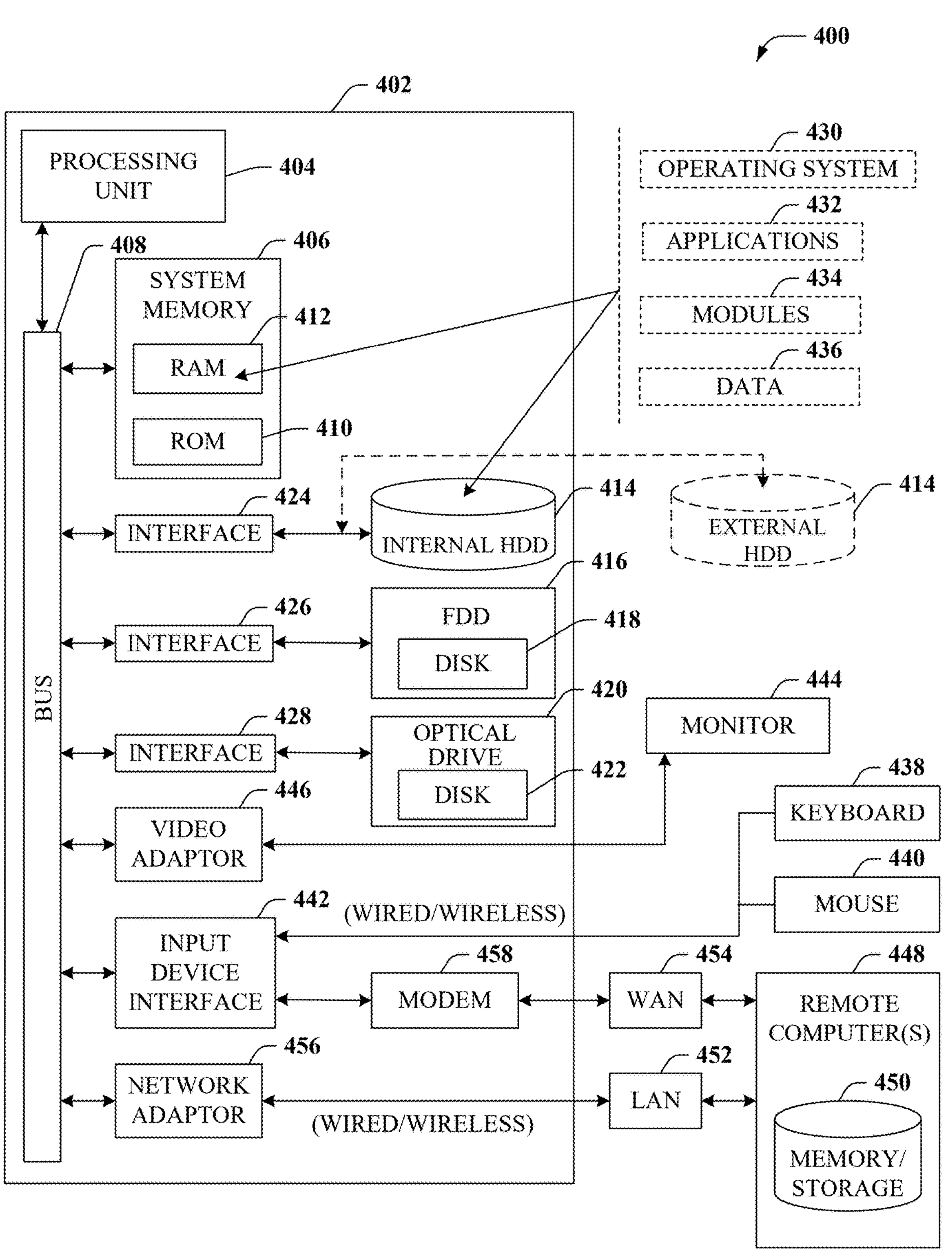
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part wireless communication systems and methods using federated learning and supervised preferential optimization.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
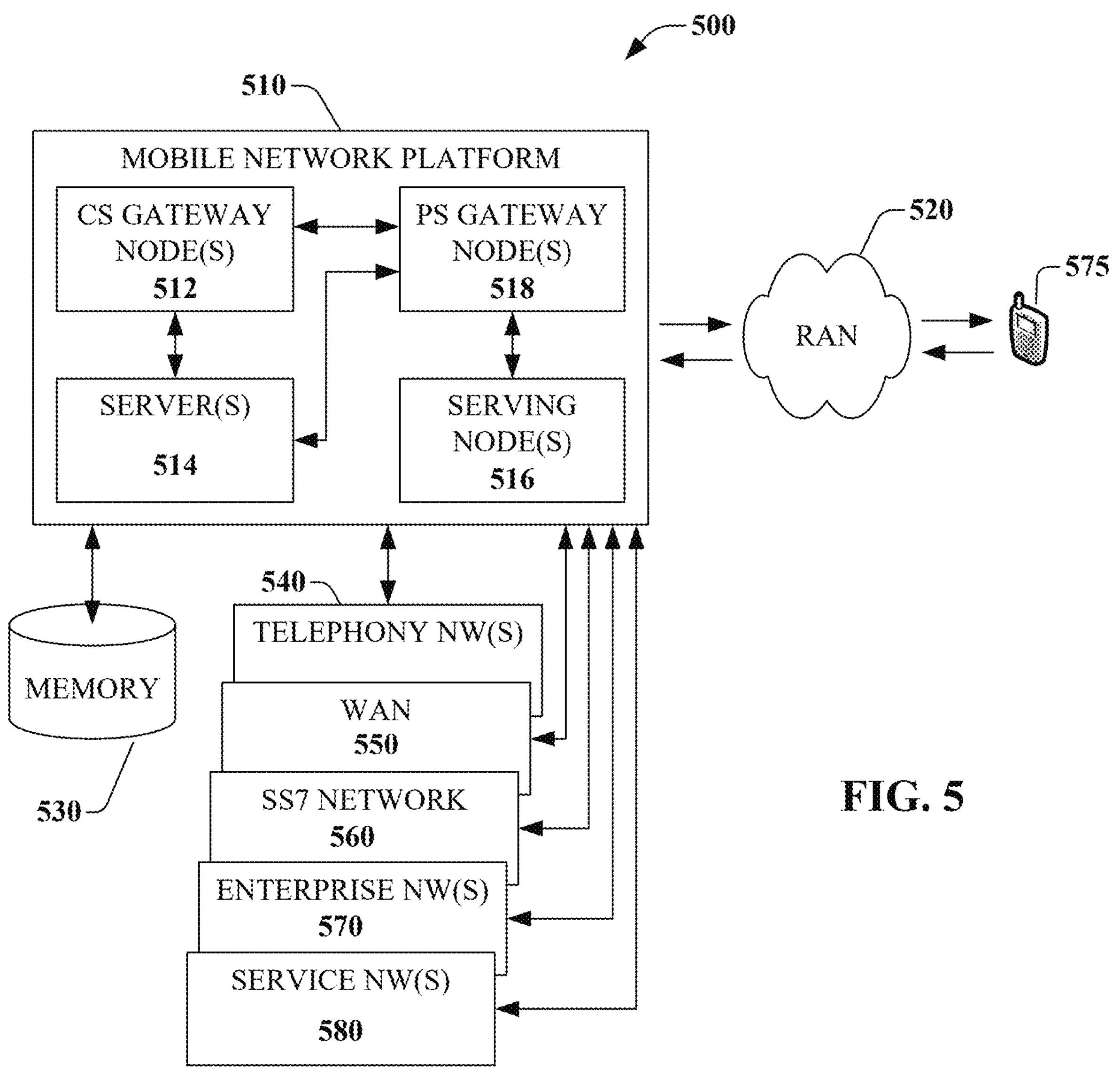
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part wireless communication systems and methods using federated learning and supervised preferential optimization. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
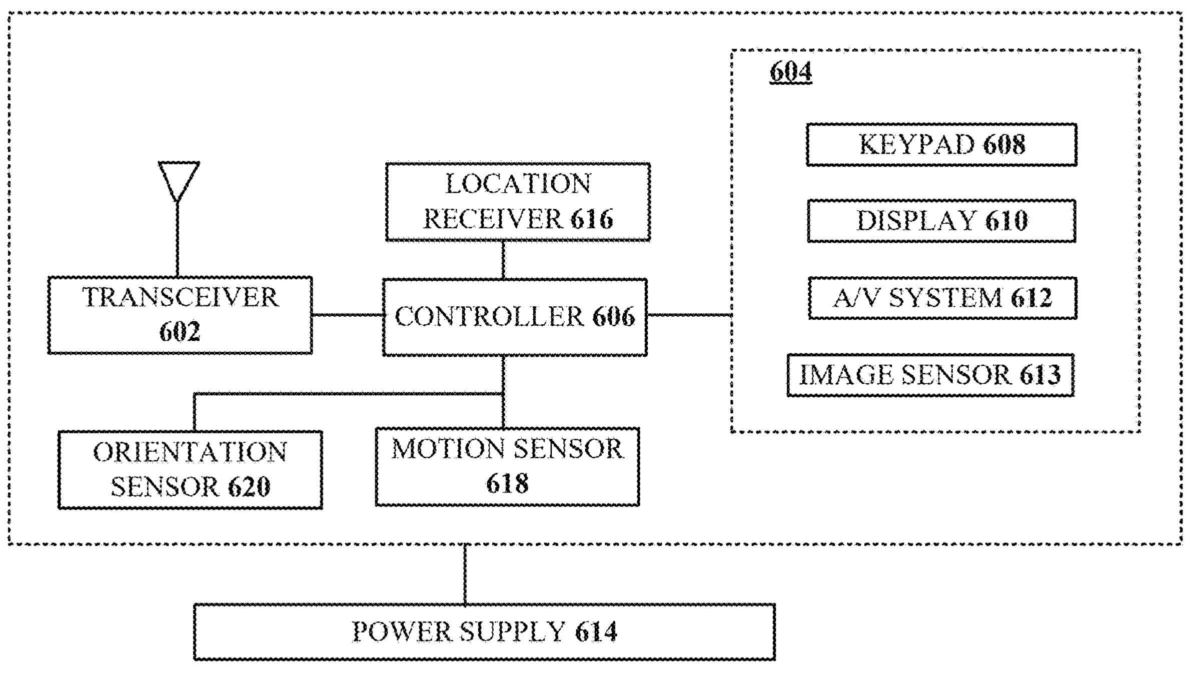
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part wireless communication systems and methods using federated learning and supervised preferential optimization.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=\text{confidence}(\text{class})$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system, comprising:

a plurality of wireless communication network components implementing different wireless communication environments, wherein, in each of the plurality of wireless communication network components, one or more base stations and one or more user equipment (UE) communicate via an intelligent reflecting services (IRS) device present therein and wherein the IRS device tracks a different wireless communication environment, resulting in a different configuration of the IRS device;

a processing system including a processor; and a memory that stores executable instructions that, when executed by the processing system, facilitate performance of operations, the operations comprising:

communicating with each of the plurality of wireless communication network components in a federated learning (FL) setting;

maintaining a global shared model having gold standard parameters of a configuration of the IRS device;

receiving, from each of the plurality of wireless communication network components, a parameter set, wherein the parameter set represents a best configuration of the IRS device based on the different wireless communication environment thereof, wherein the best configuration of the IRS device is learned and selected using a supervised preference optimization (SPO) machine learning technique; and updating the gold standard parameters of the global shared model based on the received parameter set.

2. The system of claim 1, wherein the operations further comprise sending updated parameters of the global shared model to the plurality of wireless communication network components via a feedback loop.

3. The system of claim 1, wherein the operations further comprise aggregating the parameter set from each of the plurality of wireless communication network components to form unified parameters.

4. The system of claim 1, wherein the best configuration of the IRS device is selected based on expert preference data and artificial intelligence/machine learning (AI/ML) decision-making policies.

5. The system of claim 4, wherein each of the plurality of wireless communication network components comprises an AI/ML model configured to capture the different wireless communication environment thereof and select the best configuration of the IRS device based on the captured different wireless communication environment and the expert preference data customized to the captured different wireless communication environment.

6. The system of claim 5, wherein the AI/ML decision-making policies comprise a preferred configuration of the IRS device and a not preferred configuration of the IRS device based on the expert preference data.

7. The system of claim 6, wherein the expert preference data comprise high strength signal and minimum interference during a predetermined time frame, the preferred configuration of the IRS device comprises a configuration of the IRS device that reflects signals toward high-density areas in the captured different wireless communication environment, and the not preferred configuration of the IRS device comprises a configuration of the IRS device that reflects signals toward low-density areas in the captured different wireless communication environment.

8. The system of claim 6, wherein the expert preference data comprise seamlessly maintaining reliable connectivity for one or more selected areas, the preferred configuration of the IRS device comprises a configuration of the IRS device that constantly directs signals toward the one or more selected areas in the captured different wireless communication environment, and the not preferred configuration of the IRS device comprises a configuration of the IRS device that directs signals toward other areas than the one or more selected areas in the captured different wireless communication environment.

9. A non-transitory machine-readable medium, comprising executable instructions that, when executed by a processing system including a processor, facilitate performance of operations, the operations comprising:

maintaining a shared intelligent reflecting surface (IRS) configuration model;

communicating with a plurality of wireless communication network components configured to represent different wireless communication environments, wherein each wireless communication network component comprises an action selection module running a supervised preference optimization (SPO) model and wherein the communicating comprises communicating with the action selection module in each of the plurality of wireless communication network components in a federated learning (FL) setting;

receiving, from the action selection module, a parameter set, wherein the parameter set include information indicating a selected configuration of an IRS device operating in and tracking the different wireless communication environment, wherein the selected configuration of the IRS represents a best configuration that has been learned and determined using the SPO model;

aggregating the parameter set from each action selection module of each wireless communication network component in the FL setting; and updating the shared IRS configuration model based on aggregated parameter sets.

10. The non-transitory machine-readable medium of claim 9, wherein the operations further comprise sending a feedback based on the updated shared IRS configuration model to the action selection module of each wireless communication network component.

11. The non-transitory machine-readable medium of claim 9, wherein the parameter set does not include operation data and performance data of each wireless communication network component, wherein the operation data and the performance data are locally maintained in each wireless communication network component.

12. The non-transitory machine-readable medium of claim 9, wherein the best configuration of the IRS device is selected based on expert preference data and artificial intelligence/machine learning (AI/ML) decision-making policies, and wherein the action selection module is configured to capture a different wireless communication environment thereof and select the best configuration of the IRS device based on the captured different wireless communication environment and the expert preference data customized to the captured different wireless communication environment.

13. The non-transitory machine-readable medium of claim 12, wherein the AI/ML decision-making policies comprise a preferred configuration of the IRS device and a not preferred configuration of the IRS device based on the expert preference data.

14. The non-transitory machine-readable medium of claim 13, wherein the expert preference data comprise high strength signal and minimum interference during a predetermined time frame, the preferred configuration of the IRS device comprises a configuration of the IRS device that reflects signals toward high-density areas in the captured different wireless communication environment, and the not preferred configuration of the IRS device comprises a configuration of the IRS device that reflects signals toward low-density areas in the captured different wireless communication environment, wherein the best configuration of the IRS device is selected to adopt the preferred configuration of the IRS device and avoid the not preferred configuration of the IRS device.

15. The non-transitory machine-readable medium of claim 13, wherein the expert preference data comprise seamlessly maintaining reliable connectivity for one or more selected areas, the preferred configuration of the IRS device comprises a configuration of the IRS device that constantly directs signals toward the one or more selected areas in the captured different wireless communication environment, and the not preferred configuration of the IRS device comprises a configuration of the IRS device that directs signals toward other areas than the one or more selected areas in the captured different wireless communication environment, wherein the best configuration of the IRS device is selected to adopt the preferred configuration of the IRS device and avoid the not preferred configuration of the IRS device.

16. A method, comprising:

maintaining, by a processing system including a processor, a shared intelligent reflecting surface (IRS) configuration model;

communicating, by the processing system, with a plurality of wireless communication network components configured to implement different wireless communication environments, wherein each wireless communication network component comprises an IRS device including an action selection module, and wherein the action selection module is configured to adopt a supervised preference optimization (SPO) model and wherein the communicating comprises communicating with the action selection module in each of the plurality of wireless communication network components in a federated learning (FL) setting;

receiving, by the processing system, from the action selection module, a parameter set, wherein the parameter set include information indicating selected IRS configuration operating in and tracking the different wireless communication environment, wherein the selected IRS configuration represents a best configuration that has been learned and determined using the SPO model;

aggregating, by the processing system, the parameter set from each action selection module of each wireless communication network component in the FL setting; and updating, by the processing system, the shared IRS configuration model based on aggregated parameter sets.

17. The method of claim 16, comprising:

sending, by the processing system, via a feedback loop, updated parameters of the shared IRS configuration model to the action selection module of each wireless communication network component.

18. The method of claim 16, wherein the best configuration of the IRS device is selected based on expert preference data and artificial intelligence/machine learning (AI/ML) decision-making policies, and wherein the action selection module is configured to capture a different wireless communication environment thereof and select the best configuration of the IRS device based on the captured different wireless communication environment and the expert preference data customized to the captured different wireless communication environment.

19. The method of claim 18, wherein the AI/ML decision-making policies comprise a preferred configuration of the IRS device and a not preferred configuration of the IRS device based on the expert preference data based on the SPO model.

20. The method of claim 19, wherein the best configuration of the IRS device is selected to adopt the preferred configuration of the IRS device and avoid the not preferred configuration of the IRS device.

* * * * *